Jan. 5, 1971   J. W. BADHAM   3,552,932
ADIPONITRILE APPARATUS
Original Filed Dec. 12, 1966   3 Sheets-Sheet 3

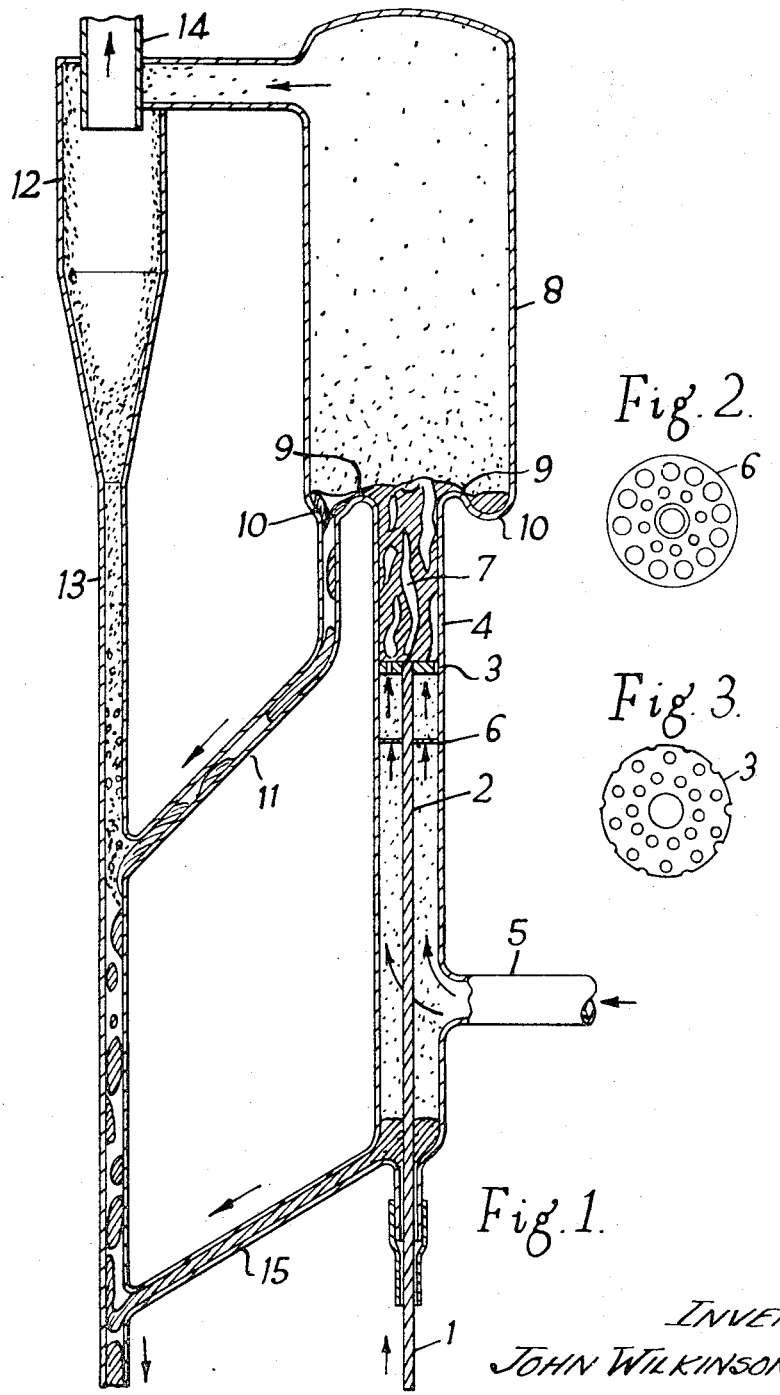

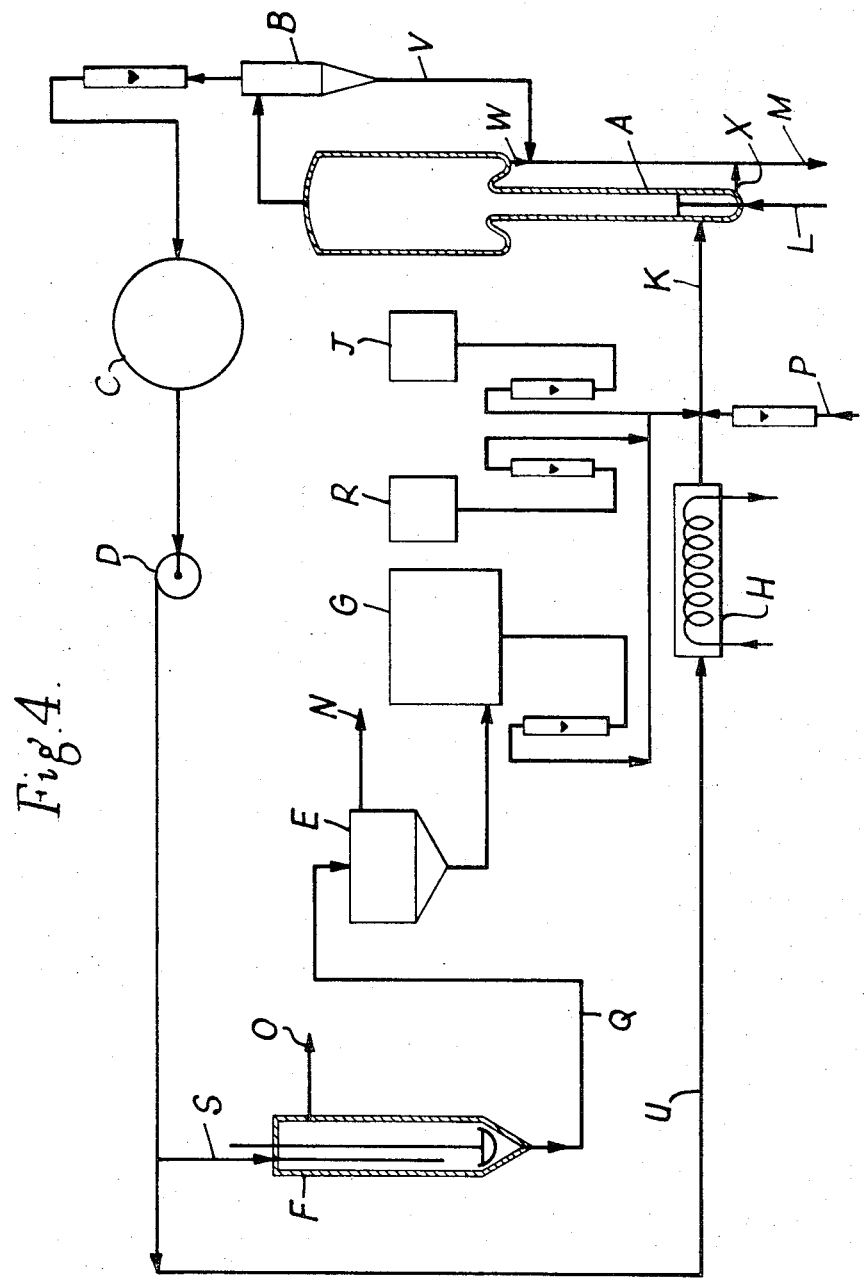

INVENTOR
JOHN WILKINSON BADHAM

United States Patent Office 3,552,932
Patented Jan. 5, 1971

3,552,932
ADIPONITRILE APPARATUS
John Wilkinson Badham, Balwyn, Victoria, Australia, assignor to Imperial Chemical Industries of Australia and New Zealand Limited, Victoria, Australia, a corporation of Australia
Original application Dec. 12, 1966, Ser. No. 600,913. Divided and this application Nov. 25, 1968, Ser. No. 821,519
Claims priority, application Australia, Dec. 15, 1965, 67,937/65
Int. Cl. B01j 1/00
U.S. Cl. 23—285                                        4 Claims

ABSTRACT OF THE DISCLOSURE

Apparatus for continuously reacting a liquid amalgam with a liquid aqueous organic phase comprising water and a monomer so as to effect conversion of the monomer to its hydrodimer. The apparatus comprises an enclosed essentially vertical reaction vessel, a vertically adjustable distributor plate extending essentially horizontally across the vessel, means for maintaining a dense fluidized bed of amalgam above the distributor plate and supported thereby, a disengagement space above the fluidized bed in which the spent amalgam and liquid aqueous organic phase may separate from each other, means for feeding amalgam into the fluidized bed above the distributor plate, means for feeding liquid aqueous organic phase into the vessel below the distributor plate which is provided with orifices through which the liquid aqueous organic phase may pass upwardly, and means for removing the spent amalgam and liquid aqueous phase containing the said hydrodimer from the vessel in the disengagement space.

---

Figure 5:
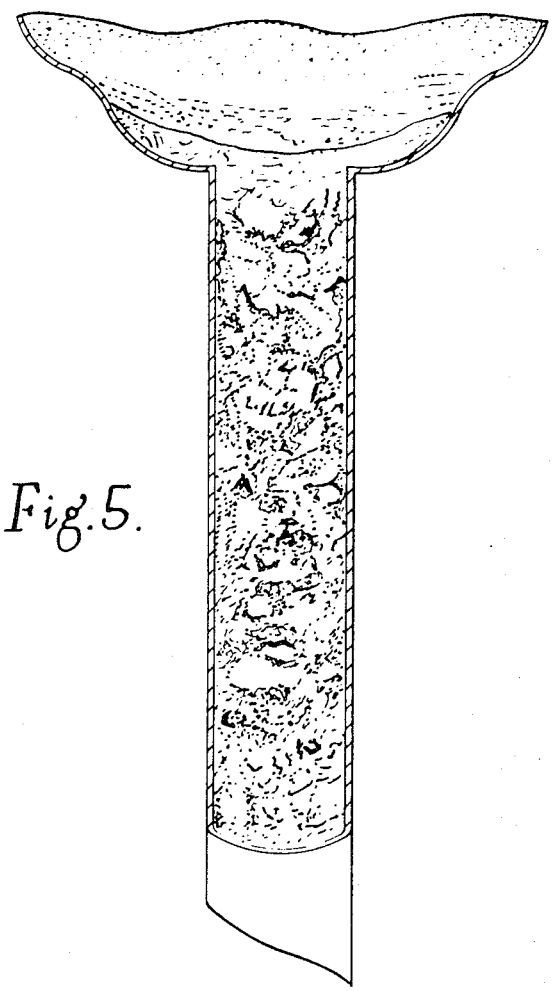

This application is a division of my copending application, Ser. No. 600,913, filed Dec. 12, 1966.

This invention relates to a process for the manufacture of dinitriles and dicarboxylates; in particular it relates to the hydrodimerisation of acrylonitrile to adiponitrile. The hydrodimerisation of acrylonitrile to adiponitrile according to the schematic equation

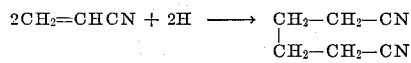

has been disclosed by Knunyants and Vyazankin (Bull. Acad. Science U.S.S.R., 1957, pp. 238–240) who used as the reducing agent an amalgam of mercury and an alkali metal and strong hydrochloric acid as the medium containing the acrylonitrile in dilute solution. With the system adiponitrile was formed, but a large proportion of the acrylonitrile was converted to propionitrile and this has made the process uneconomic. Dutch patent specification No. 6504863 describes an improved process of reductive dimerisation of olefinic compounds selected from the group consisting of alpha-beta mono-olefinic nitriles and esters of aliphatic alpha-beta mono-olefinic carboxylic acids wherein the reductive dimerisation is carried out in a medium capable of providing reactive hydrogen by reacting a metal amalgam selected from the group consisting of alkali and alkaline earth metal amalgams with said medium in the presence of at least one salt capable of forming alkylated cations in said medium.

Other hydrodimerisation processes, in the performance of which the present invention may be employed, are described in the specifications of the published Dutch applications 6515216 and 6613474 and their U.S. counterparts, S.N. 507,528, now U.S. Pat. 3,455,986, and S.N. 579,885, respectively.

In these earlier processes additives, e.g. alkylated captions or sulphoxides or sulphones are used to depress the undesired full hydrogenation of the monomer. While the benefit of the additive—partial depression of the full hydrogenation—appears already at fairly low concentrations, maximum depression, particularly in systems comprising 50% w./w. or more of water, occurs only at substantial concentrations; the actual maximum depression of hydrogenation varies, of course, with the additive, the monomer used and the reaction conditions. In general, maximisation of the dimerisation reaction and hence fairly high proportions of additives are required, particularly when the reaction medium is predominantly aqueous. One disadvantage of the use of additives is that these must, of course, be removed from the reaction product by a separate process such as distillation or solvent extraction. Another disadvantage of using high concentrations of additives is their first cost and the cost of make-up of reagent which increases, at least to some extent, as the total quantity of additive used is increased. A further disadvantage of the prior art processes is the formation of yet another undesired by-products such as trimers and tetramers of acrylonitrile and, at low hydrogen ion concentrations, i.e. a pH in excess of 9.5, the occurrence of the cyanoethylation reaction.

Yet another disadvantage associated with the use of amalgam in the hydrodimerisation reaction is that, for large scale use, the reaction rate is still relatively slow, e.g. in a predominantly aqueous system in the order of 0.001 to 0.0035 kg. moles of monomer converted to adiponitrile/m.$^2$ amalgam surface/hour. Even when a relatively high external potential (e.g. 17–19 v.) is superimposed on the mercury electrode as e.g. in the case of U.S. Pat. 3,193,481, Monsanto, the current densities achieved e.g. in Examples 1 to 5 are equivalent to 5.5–6.2 A./dm.$^2$, i.e. at a 75% yield, reaction rate is in the order of 0.015 to 0.017 kg. moles of monomer converted to adiponitrile/m.$^2$ amalgam surface/hour. To carry out such processes on industrial scale very large quantities of mercury and large-surface-reactors are required and the attendant capital and operating costs are substantial.

If amalgam is used without an external electrical circuit, the denuding of amalgam to mercury on technical scale in non-acidic media is a relatively slow and poorly reproducible reaction; although it can be accelerated and controlled by addition of reaction promoting additives such as the quaternary ammonium salts defined in our above-mentioned cograted applications, the resultant reaction rates achieved are still only in the order of 0.005 kg. moles of monomer converted to adiponitrile/m.$^2$ amalgam surface/hour. High conversions better than 94%! of the sodium in the amalgam are difficult to achieve on technical scale without excessive residence time; hence incomplete denuding with the attendant inconvenience in work-up and recycles and losses or, alternatively, excessive residence time, reactor size and mercury volume must be faced. The precise mechanism of the overall reaction and the function of the additive in accelerating the desired reaction are not fully understood nor is it clear which of the sequential steps in the reaction is rate-determining. The complexity of the factors determining rate of reaction is apparent even in the simplest case of denuding—the denuding of sodium from amalgam by extraction with water in the absence of a secondary organic reaction; this reaction proceeds only sluggishly unless special denuders, graphite electrodes or external potentials are provided; a mere increase in agitation does not bring about corresponding increases in the rate of denuding.

We have now found that, in the above hydrodimerisation reaction in aqueous media, the undesired full hydrogenation can be suppressed with substantially smaller amounts of additive if the analgam phase and the phase containing the reactants are maintained in a state of turbulent motion. In addition we have found that the formation of undesired by-products such as oligomers of acrylonitrile or dicyanoethylether can be repressed, the occurrence of blockages of the reactor by solid by-products can be reduced and, mainly, vastly increased reaction rates and virtually complete conversion of the sodium can be achieved under these conditions. Consequently, smaller reactors may be used.

Accordingly we provide a process for the reductive dimerisation of an alpha-beta mono-olefinically unsaturated nitrile or ester which comprises reductively dimerising said unsaturated nitrile or ester in a medium capable of providing reactive hydrogen by reacting a metal amalgam selected from the group consisting of alkali and alkaline earth metal amalgams with said medium in the presence of at least one additive promoting the hydrodimerisation reaction characterised in that the amalgam phase and the phase containing the monomer are maintained in turbulent motion.

When turbulence is effected in a stirred reactor it may be defined in terms of Reynolds numbers. The definition of the Reynolds number is given in chemical engineering textbooks e.g. Perry, IVth edition, Section 19.9; the conditions of reactor and stirrer design under which the turbulence in a reactor is equivalent to and defined by the Reynolds number at the circumference of the stirrer are also known from chemical engineering textbooks, e.g. Agitator Selection and Design, Engineering Equipment Users' Association Handbook No. 9, Constable and Co. Ltd., London, 1962, pages 5–8.

An alternative definition of turbulence may be derived from the concept of rate of energy dissipation expressed in wave numbers (cm.$^{-1}$). This definition is applicable to both turbulence in a stirred reactor and turbulence produced in a "fluidised amalgam bed" as described below by passing the phase (or phases) containing the monomer through the amalgam bed. The energy dissipation concept thus affords a broader definition of the underlying turbulence phenomenon and, in the case of turbulence of the monomer phase, is convertible into Reynolds numbers. The intensity of turbulence is defined by the energy dissipation wave number $K_d$, in cm.$^{-1}$, which mathematically determines the point at which viscous forces become dominant over the inertial forces of a turbulently flowing fluid. $K_d$ may be calculated from the expression $$K_d = \left(\frac{3\gamma^2 \epsilon}{8\nu^3}\right)^{1/4} \text{cm.}^{-1}$$

given by G. K. Batchelor, "Homogeneous Turbulence," Cambridge University Press, 1953, page 130 where:

$\gamma$=universal constant, given by Batchelor as 0.45±0.05; for the purpose of definition here 0.45 is used;
$\epsilon$=rate of energy dissipation per unit mass of turbulent fluid (cm.$^2$/sec.$^3$);
$\nu$=kinematic viscosity of the turbulent fluid (cm.$^2$/sec)..

In a stirred vessel, the rate of energy dissipation is given by the power dissipated by the impeller, which may be calculated from Power Number curves, see Perry IV, "Engineers' Handbook," Section 19.15. The length parameter required is the length of the turbulence generating medium, the stirrer or paddle in this case.

In a "fluidised bed" as defined below, the rate of energy dissipation is estimated from the energy required to force the fluidising phase (or phases) through the amalgam phase, and through the distributor plate.

In a "fluidised bed," the Reynolds number for the fluidising phase (or phases) is calculated from the following expression:

$$\text{Re} = \frac{vd}{\nu}$$

where $v$=average velocity of the fluidising phase(s) through the distributor plate holes;
$d$=hydraulic diameter of the distributor plate holes=

$$\frac{4 \times \text{total hole area}}{\text{total peripheral length of the holes}}$$

$\nu$=kinematic viscosity of the fluidising phase(s).

In the case of the fluidising phase, which contains the reacting monomer e.g. acrylonitrile, the turbulence energy dissipated by the fluidising phase is taken to be equal to the energy given by the pressure drop of the fluid through the distributor plate. The turbulence energy dissipated by the amalgam phase is taken to be equal to the energy required to force the fluidising phase (or phases) through the amalgam phase. The volume and physical properties required to estimate the energy dissipation wave numbers within these two regions are taken to be the volumes and physical properties of each separate phase within the reactor.

It is understood that the calculation of both the Reynolds number and the energy dissipation wave number, and their interconversion, are based on simplifying assumptions and approximations; nevertheless they suffice to define the degree of turbulence required for this invention.

By turbulent motion we mean that the energy dissipation wave number of the amalgam phase is greater than 100 cm.$^{-1}$, preferably greater than 400 cm.$^{-1}$ and most preferably greater than 600 cm.$^{-1}$; expressed in the alternative term of the (stirred reactor) Reynolds number those limits correspond to figures of 10,000, preferably 60,000 and most preferably 100,000 respectively.

It is preferable that the phase(s) containing the monomer phase is characterised by a wave number greater reactor turbulence of the monomer phase is given by a Reynolds number greater than 10,000. In the case of a "fluidised bed" as defined below, turbulence of the monomer phase is charcterised by a wave number greater than 80 cm.$^{-1}$ and more preferably by a wave number greater than 170 cm.$^{-1}$; Reynolds numbers corresponding to this latter value will be greater than 1000.

Suitable combinations of degree of agitation in the two phases according to our invention are e.g.

REYNOLDS NUMBER IN

| Amalgam phase | Phase containing monomer |
|---|---|
| 100,000 | 1,000 "fluidised bed." |
| 60,000 | 3,000 "fluidised bed." |
| 10,000 | 10,000 (stirred reactor). |

Turbulence may be effected by a number of methods; one method is to provide intense agitation in the region of intimate contact between the amalgam phase and the phase containing the monomer; a stirrer at the interface or separate stirrers in either phase may be used, optionally with baffles. Another method comprises agitating the two phases by jet mixing, either by injecting one or more jets of amalgam into the phase containing the monomer or, preferably, by injecting one or more streams of the phase containing the monomer into the amalgam phase. Yet another method comprises passing the aqueous phase upwardly through a sieve-tray or bubble cap-column containing a layer of amalgam on each tray.

While turbulent agitation produces improved results it still suffers from the disadvantage that a fair depth of mercury, at least in the order of several inches, is required for effective stirring. Hence in the case of a predominantly aqueous system on technical scale a practical embodiment would still involve substantial quantities of mercury; thus e.g. at the fast reaction rate of 3.75 kg. mole of acrylonitrile converted to adiponitrile c./m.$^2$ of amalgam surface/hour and 85% yield of adiponitrile about 7 stirred tank reactors of 4 ft. diameter having a pool of mercury 1 ft. deep and containing a total of 75,000 lbs. of mercury, would be required to produce 10,000 tons p.a. of adiponitrile. In other words, the production rate per mass unit of mercury used in the process is still lower than ideal.

We have now found that a fast rate of reaction per unit volume of reactor and per unit mass of amalgam as well as a high yield of the hydrodimer may be obtained with relatively small quantities of amalgam in what, in a slight modification of the conventional term, for convenience is referred to throughout this specification as a "fluidised bed." Accordingly a particularly preferred method of carrying out our process comprises maintaining the amalgam in intimate mixture with the phase containing the monomer in a "fluidized bed," reacting the amalgam and separating the reacted amalgam from the phase containing the monomer. By the term "fluidised bed" we mean that the lowest limit of fluidisation of the amalgam phase is characterised by a bulk density of the intimately mixed phases 5% lower than that of the amalgam and the upper limit is the state when essentially the whole of the reacting amalgam is dispersed in the form of particulate droplets in the phase containing the monomer. Alternatively the bulk density of the "fluidised bed" may be characterised by a more convenient term, the volume fraction, i.e. the volume of the amalgam phase in the bed expressed as percentage of the volume of the "fluidised bed." A preferred range of fluidisation is given when the "fluidised bed" consists of between 90% and 10% v./v. of amalgam. More preferably the "fluidised bed" comprises between 65 and 20 percent and most preferably between 65 and 40 percent by volume of amalgam, the balance being the other phases, i.e. the phase (or phases) containing the monomer and any other phases present such as e.g. gaseous carbon dioxide or solid sodium bicarbonate. The preferred conditions defined by 65 to 20% v./v. amalgam in the bed, are referred to below for convenience as a "dense fluidised bed," where the amalgam is not disintegrated into particulate droplets but remains as an essentially coherent and essentially physically interconnected fluid in which the voids formed by the other phases fluctuate rapidly and pass through the amalgam. In practical operation the top and thereby the total volume of the "dense fluidised bed" on which the above definition is based is fairly well defined visually, although a narrow intermediate zone of particulate droplets of spent amalgam dispersed in the fluidising phase(s) may at times be present above the bed; in defining the volume of the "dense fluidised bed" we exclude this intermediate phase. In practice a convenient cut-off of the "dense fluidised bed" may be achieved by providing a widened section in the reactor above the dense bed at which the flow velocity is reduced and at the bottom of which the "dense fluidised bed" terminates.

One benefit of operating our process in a continuous amalgam phase, below the limit at which complete dispersion of the spent amalgam into separate, particulate droplets occurs, e.g. as a "dense fluidised bed," is that under turbulent conditions substantial backmixing of the amalgam occurs and the alkali metal concentration in the amalgam at least up to a ratio of reactor length/diameter of 4, is fairly uniform. This makes it possible to avoid complete denuding and to retain a carefully controlled residue of alkali (or alkaline earth) metal in the amalgam, say as little as 0.01 or even 0.0001% w./w. We have found, surprisingly, that under our reaction conditions, particularly in the presence of highly surface active quaternary additives and organic substances, finely dispersed droplets of pure mercury do not coalesce readily but may form extremely tenacious emulsions which are difficult to separate from the aqueous organic phase and may lead to substantial mercury losses. While we do not wish to be restricted by theory we consider that the reactivity of the alkali metal residue in the nearly spent amalgam with the surrounding monomer in the medium disrupts the single or double layers of organic and/or aqueous films around pure mercury which appear to stabilise the undesired mercury dispersions.

Means for intimately mixing the amalgam phase and the second phase are known in the art, e.g. one or more nozzles, spray noses, distributor pipes fitted with orifices or distributor plates.

A preferred process of producing the "fluidised bed" according to our invention comprises feeding the amalgam phase into a reactor and onto at least one distributor plate extending across said reactor so as to form an amalgam bed, simultaneously passing an upward stream of a second phase containing the monomer, optionally together with any gaseous phase, e.g. carbon dioxide, through one or more orifices in said distributor plate at such a velocity that said second phase, optionally aided by the gaseous phase, agitates and fluidises the amalgam phase and then separating the phases after interaction. After denuding, the spent amalgam may be removed by upstream flow e.g. by entrainment in the second phase, and separated from it by means of a liquid cyclone; alternatively and preferably the reactor is provided with a widened cylindrical section which extends above the upper end of the "dense fluidised bed," and, at the transition point between the narrow and wide sections, is fitted with overflow means such as a drain pipe or a weir over which the spent amalgam flows and from which it may be fed back to the electrolyser.

The widening of the reactor provides a convenient method of reducing flow velocity and thereby minimising entrainment of any dispersed spent amalgam. Optionally a liquid cyclone may be added upstream to remove any residual entrained spent amalgam. The reacted amalgam may also be allowed to flow back through the orifices of the distributor plate at a controlled rate and is then collected at the bottom of the reactor.

We also provide apparatus for the process above described which comprises an enclosed reactor, means for feeding amalgam into said reactor, a distributor plate extending across said reactor and having one or more orifices, means for feeding the phase containing the monomer through said orifices into said reactor and upwardly through said reactor at a velocity sufficient to provide fluidisation of the amalgam bed as defined above, Additionally, means for separating the amalgam phase from the fluidising liquid phases after interaction in the fluidised bed such as a cyclone may be provided.

One embodiment of the fluidised bed operation and apparatus according to this invention is represented by the attached drawings of which FIG. 1 is a schematic cross section in side elevation through the apparatus, FIGS. 2 and 3 are schematic plans of items 6 and 3 and FIG. 4 is a flow diagram. FIG. 5 is a side view in perspective, prepared from a photograph, of the "dense fluidised bed" as above defined, the weir and the disengagement space (partial view). In FIG. 1 a stream of amalgam 1 is admitted to the bed through the pipe 2 and flows on to the top distributor plate 3. The second, aqueous or aqueous organic phase containing the monomer is pumped to the cylindrical reactor 4 through the pipe 5, flows up the annular section of reactor 4 through two distributor plates 6 and 3. On plate 3 the dense fluid bed 7 is formed. Items 6 and 3 are shown in plan in FIGS. 2 and 3 respectively; the bottom distributor plate 6 is designed to control flow of the second phase; the top distributor plate has fine orifices designed to achieve the flow velocity of the second phase required for "fluidisation" of the amalgam and, at the same time, to control, minimise or prevent, as desired, the downward (back) flow of amalgam through the orifices. Design data to this effect are known in the art and/or can be found empirically for each reactor. In the wider section 8 of the reactor acting as disengagement space flow velocity is reduced and the dense bed is terminated. The position of the distributor plate 3 can be adjusted by moving feed line 2 up or down and this, in conjunction with control of the flow velocities of the fluid phases, permits regulation of the depth of the dense bed. The bulk of the essentially denuded mercury then flows over weir 9 into channel 10 and through pipe 11 and a pressure-equalising lute, not shown, back to the electrolyser to be re-amalgamised. The physical appearance of the "dense fluidised bed" 7 is indicated by FIG. 5.

Disengagement space 8 allows sufficient reduction in flow velocity to remove most of the entrained spent amalgam. The second phase usually consisting of aqueous liquor containing sodium bicarbonate, organic materials or solvents and some residual entrained mercury then passes into a Hydroclone 12, which removes any residual entrained mercury through standpipe 13, and flows then through pipe 14 to the product work-up and recycle system. Any amalgam which may fall back through the distributor plates is collected at the base of the reactor and drained through pipe 15 and an equalising lute, not shown, back to the amalgam regeneration system.

FIG. 4 demonstrates the arrangement of the apparatus used for continuous hydrodimerisation of acrylonitrile in a predominantly aqueous reaction system comprising, at equilibrium, an aqueous phase, a small amount of an organic phase (say 3 to 10% w./w. of the aqueous phase) and amalgam. The fluidised reactor of FIG. 1 is represented as A. Amalgam is admitted to it through line L and the aqueous phase is fed in through the measured and controlled stream K. Carbon dioxide necessary for pH control and the neutralisation of sodium is injected into line K through line P fitted with a flowmeter. Make-up acrylonitrile and aqueous quaternary ammonium salt solution are admitted into stream K through head tanks R and J. The essentially denuded mercury is recycled to the amalgam regeneration system, not shown, through line M, to which also the spent amalgam removed in Hydroclone B and any residues from reactor A are drained through lines V, W and X respectively. C represents the storage feeding recycle pump D and H is the heat exchanger which regulates the temperature in the reactor. The reaction product is taken off continuously as stream S through separator F where it is split into an organic phase stream O, and an aqueous slurry Q which is fed to centrifuge E. Sodium bicarbonate N is filtered off from the system in centrifuge E and the aqueous liquor containing some dissolved organic material and sodium bicarbonate is recycled to the process via head tank G. The product bleed-off stream S serves also as a means of controlling the slurry concentration. Circulation stream U, through heat exchanger H, serves to control flow velocities, fluidisation, dispersion of solid sodium bicarbonate and temperature of reaction. When a predominantly organic system is used, in which there is no separate aqueous phase, the mode of operation is similar, but separator F is omitted; sodium bicarbonate is filtered off from the reaction product stream S on centrifuge E and the hydrodimer produced is then separated from unreacted monomer, solvent and hydrodimerisation additive by distillation or extraction, or a combination of distillations and extractions, in a manner obvious to those skilled in the art.

The benefit of our mode of operation in turbulent motion, preferably in a "fluidised bed," is quite generally applicable to the hydrodimerisation processes of monoolefinically unsaturated esters and nitriles using amalgam reduction systems and especially to the processes forming the subject of the aforementioned patent applications.

By additives promoting the hydrodimerisation reaction we mean especially the salts capable of forming alkylated cations in the medium which are described in the aforementioned published Dutch patent specification, namely ammonium, phosphonium or sulphonium cations such as tetraalkylammonium salts, tetraalkylphosphonium salts, trialkylsulphonium salts and, furthermore, certain polar aprotic solvent additives e.g. sulpholane, dimethylsulphoxide, formamide, dimethyl formamide and dimethyl acetamide. The preferred additives for predominantly aqueous media are the fully alkylated onium salts aforementioned and, amongst these, particularly quaternary ammonium compounds of the formula $R^{I}R^{II}R^{III}R^{IV}NX$ where $R^{I}$ is selected from the group consisting of methyl, ethyl, isopropyl, n-propyl and isobutyl, $R^{III}$ is alkyl, including cycloalkyl, $R^{IV}$ is alkyl, and X is an anion and wherein, optionally, $R^{II}$, $R^{III}$ and $R^{IV}$ may be linked directly or, optionally, through one further atom selected from the group consisting of nitrogen, oxygen and sulphur to form a non-aromatic monocyclic or bicyclic ring. Preferably at least one of the alkyls $R^{III}$ and $R^{IV}$ has more than 12 carbons in the chain; the most preferred additive in media containing more than 50% water is trimethylcetylammonium bromide. The reaction conditions for each reagent are as disclosed in the above cited applications, with the exception that the amalgam phase and the phase containing the monomer are turbulently agitated.

The preferred additives in media comprising more than 50% of polar aprotic solvents are the tetraalkylammonium salts, particularly tetramethylammonium-, tetraethylammonium- and trimethylethylamonium salts, e.g. the halides, especially the chlorides.

Throughout this specification the compositions of the reaction medium, unless stated otherwise, are given by weight and exclusive of the amalgam phase.

From Examples 24 to 31 it is apparent that in predominantly aqueous media concentrations of quaternary ammonium salt as low as 0.1% w./v. of the reaction mixture achieve high reaction rates and repression of the undesired side reaction; substantial repression is obtained at 0.5% w./w. Similar reductions in the amount of additive needed for a given adiponitrile yield under conditions of turbulent flow in both phases have been obtained with other additives of this type; however, the extent to which the undesired fully hydrogenation can be suppressed varies to some extent with the type of additive and other reaction conditions.

When a medium comprising more than 50% polar aprotic solvent is used the preferred conditions are again those already described for this particular medium in United Kingdom patent application No. 1,621/66 and its equivalents elsewhere which are identified hereinbefore. Thus a preferred process comprises reductively dimerising an alpha, beta olefinically unsaturated nitrile or ester by causing an alkali metal amalgam to interact with a homogeneous reaction medium which comprises the alpha, beta unsaturated nitrile or ester, a proton source such as water or methyl or ethyl alcohol, a quaternary ammonium salt having radicals of aliphatic character attached to the nitrogen atom and a polar organic solvent that is unreactive in the reaction medium and towards the amalgam, and which reaction medium has an apparent pH from 7 to 11.5, and contains a proportion of alpha, beta unsaturated nitrile or ester within the range of from 2.5 to 70 mole percent, a proportion of a proton source within the range of from 1 to 30 mole percent, and a proportion of quaternary ammonium salt exceeding 0.2 mole percent and preferably not exceeding 8 mole percent, the remainder consisting essentially of polar organic solvent, characterised in that the amalgam is maintained in intimate mixture with the phase containing the monomer and in that the degree of turbulent fluidisation of the amalgam is as above defined.

The medium capable of forming hydrogen with an alkali metal amalgam which medium carries the monomer is preferably water; however, alcohols, say methanol, ethanol or cyclohexanol, may partly or fully replace water in amalgam hydrodimerisations. Suitable solvents are e.g. acetone, acetonitrile, adiponitrile, formamide, dimethylformamide, dimethylsulphoxide, diethylformamide, diethylacetamide, dioxan and tetrahydrofuran. Most preferred aprotic solvents are acetonitrile and adiponitrile. The amount of water, again, may vary over wide ranges and, in general, is not narrowly critical; in predoimnantly aqueous systems the ranges described in the aforementioned Dutch patent specification and its equivalents elsewhere, e.g. from 1 to 80 moles of water per mole of monomer may be used; for the predominantly aprotic polar systems of the abovementioned U.S. application Ser. No. 579,885, preferably from 1 to 10% by weight of the reaction medium (excluding amalgam) may be used.

Polar aprotic solvents e.g. dimethylformamide or dimethylsulphoxide are effective as agents promoting amalgam hydrodimerisation reactions even in the absence of ammonium, phosphonium or sulphonium salts. Our process is equally applicable under these conditions.

The benefits of our invention are most pronounced under neutral to alkaline conditions. By neutral to alkaline we mean an apparent pH not substantially less than 7 and not more alkaline than the apparent pH at which cyanoethylation occurs, i.e. not more than 11.5, preferably not more than about 9.5. A lesser but still substantial depression of the reaction leading to propionitrile may be also attained in acid medium, as already disclosed in the abovementioned Dutch patent specification No. 6504863.

Throughout this specification the term pH relates to the "apparent" pH, i.e. a given reading on a conventional pH meter using a glass electrode, because it cannot be presumed that in aqueous organic or predominantly organic solvent systems a given reading on conventional pH recording equipment or a particular colour change in the case of a chemical indicator will have precisely the same significance in terms of hydrogen ion concentrations as it would have in wholly aqueous systems. Nevertheless, it is convenient to regard an effective pH of less than 7 as indicating acidic conditions and an effective pH of greater than 11.5 as indicating strongly alkaline conditions since the behaviour of, for example, acrylonitrile or methyl acrylate under such conditions is consistent with the behaviour expected for it under conditions properly regarded as acidic or highly alkaline.

The pH may be maintained by the controlled addition of acid, as disclosed in the above cited earlier applications.

A convenient and preferred method of controlling the apparent pH between 7 and 9.5 is the addition of carbon dioxide by maintaining in the reaction vessel a suitable concentration of the gas and promoting the rate of solution of the gas in the reaction liquid e.g. by agitation of the liquid. An atmosphere of pure carbon dioxide is preferred because it avoids the complications resulting from recovery of gaseous acrylonitrile from a large insert gas stream. Slightly superatmospheric pressure is most convenient, but higher and even reduced pressures may be used. By reaction of the alkali hydroxide with the carbon dioxide in the presence of water in the reaction medium, the bicarbonate of the alkali metal is formed and precipitated. Conveniently it may be separated e.g. by intermittent filtration or by continuous filtration e.g. by circulating part of the reaction mixture through a filter or a centrifugal separator, so as to avoid build-up of a high concentration of solids.

Instead of alkali metal amalgams, it is possible to use the amalgams of the alkaline earths. In normal commercial practice, however, potassium and particularly sodium amalgams are preferred since these are readily available from large scale processes and the corresponding neutralisation by-products are of commercial value.

The content of alkali or alkaline earth metal in the amalgam feed may also vary over wide ranges from saturation point to fairly low concentrations; 0.3% Na w./w. is a suitable concentration.

Ambient temperatures between 0 and 60° C. are suitable for the reaction and 20 to 45° C. are preferred, but both lower and higher temperatures may be used.

Since in our process, particularly in the "fluidised bed" reaction, extremely high reaction rates per unit mass of mercury and per unit volume of reactor can be achieved, up to 100 times faster than those of the prior art, and since the overall reaction is exothermic, means for maintaining the desired temperature range must usually be provided. One convenient method is to circulate the phase containing the monomer through a heat exchanger. As a rule the flow velocities required to bring about fluidisation of the amalgam are such that the heat of reaction is removed as sensible heat in the effluent and efficient cooling can be effected conveniently through an external heat exchanger.

As the formation of polymer is undesired we furthermore prefer in practice to add a suitable inhibitor of the vinyl-type polymerisation. Suitable inhibitors are the polymerisation inhibitors known from the technology of polymerisation of vinyl monomers. A particularly suitable, preferred inhibitor is N,N-dimethyl p-nitrosoaniline.

Our process can be carried out batchwise or continuously, but its advantages are utilised best in a continuous reactor preferably, as stated, in a continuous "fluidised bed" reactor. The amalgam phase can be conveniently separated from the aqueous phase by means of a Hydroclone. The spent amalgam from our process forms a distinct surface which, because of its high surface tension, gives rise to few entrained droplets only. This combined with the high specific gravity of these droplets makes them particularly easy to separate in a Hydroclone. The organic phase, where formed as a separate phase, the aqueous (organic) phase and the solid by-product phase are worked up by separation of the liquid phases e.g. by decantation, removal of solid salt by filtration of centrifuging and fractional distillation or solvent extraction of the aqueous monomer/hydrodimer/cationic salt phase by techniques known per se and the unreacted raw material is recovered.

When the process is operated continuously using carbon dioxide as neutralisation agent, precipitation of sodium bicarbonate occurs in the reactor. The solid salt may coprecipitate some mercury and then an additional separation step may be required after filtration of the salt to recover the mercury.

According to a further feature of our process this difficulty may be avoided in a pedominantly aqueous medium by cooling the aqueous phase exit stream from the reactor to a temperature below the reaction temperature thereby causing sodium bicarbonate to crystallise outside the reactor and reducing sodium bicarbonate concentration in the exit stream, removing precipitated sodium bicarbonate from the stream, recycling the filtered stream to the reactor, heating said filtered stream to the reaction temperature, at which it is unsaturated with respect to sodium bicarbonate and, during its passage through the reactor, dissolving in it sodium bicarbonate formed in the hydrodimerisation reaction. By this technique the precipitation of sodium bicarbonate in the presence of mercury can be avoided or the amount of crystals precipitated can be reduced.

By the term "alpha, beta mono-olefinically unsaturated nitrile" throughout this specification, we mean acrylonitrile itself and its homologues bearing at least one alkyl substituent having up to 4 carbon atoms in the alpha or beta carbon atoms joined by the double bond. However, it is already known that in respect of hydrodimerisation the alpha, beta mono-olefinically unsaturated mono- or di-carboxylates, say, methyl or ethyl esters are equivalent to the corresponding nitriles. Hence it is within our invention to apply the process as described in an analogous manner to the hydrodimerisation of mono- or di-carboxylates to paraffinic di- or tetra-carboxylates.

One benefit of our invention is the reduction in quantity of additive required. This permits economies in the first cost and cost of make-up of the additive; it also greatly facilitates the work-up of the reaction mixture, reduces capital and operating cost on crystallisation and/or distillation and/or extraction equipment; it also facilitates the integration of our process with an existing mercury chlorine cell where the pure mercury is to be converted again into amalgam and where the requirements on purity of the mercury and absence of all surface active or organic materials are stringent. Another major advantage is the vastly increased rate of production per unit mass of mercury and per unit volume of reactor space required for a given plant. A further advantage is the denuding of the amalgam to the desired minimum of alkali metal residue and the associated greater ease of operation in a single pass, separation, simplified work-up and reuse in mercury cells. Other features are the high yield of dimer obtainable, the repression of other side-reactions at low concentrations of reaction promoter, and high conversion of acrylonitrile per pass.

Our invention is now illustrated by, but not limited to, the following examples. In these the effect of turbulence on sodium conversion, as a parameter of reaction rate, is demonstrated in Examples 1 to 21, 39 to 54 and 55 to 79. The improved yield of adiponitrile and the repression of undesired by-products at lower concentrations of quaternary ammonium compounds is shown in Examples 22 and 23. Examples 32 to 35 inclusive demonstrate consistently high yields on prolonged continuous operation. The high reaction rates per mass unit of mercury used and per reactor volume, the repression of undesired by-products at extemely low concentrations of quaternary ammonium compounds and the mode of operation in a fluid bed reactor are demonstrated in Examples 24 to 31 inclusive. The operation in media comprising more than 50% w./w. of aprotic polar solvents is shown in Examples 36 to 38 inclusive.

Unless otherwise stated units are c.g.s. units.

EXAMPLES 1–21

Examples 1 to 21 inclusive show the benefit of turbulent agitation on sodium conversion which is indicative of reaction rate and economy of amalgam usage.

$$\text{Percent sodium conversion} = 100 \cdot \left\{ \frac{\text{Mass of sodium fed in amalgam.} - \text{Mass of sodium in exit amalgam stream.}}{\text{Mass of sodium fed in amalgam.}} \right\}$$

The reactor consisted of a glass tube of 4″ internal diameter and 6½″ internal height which at the bottom was sealed fluid-tight onto a cylindrical, jacketed, 1″ deep and 4″ I.D. trough which, for better heat transfer and wetting of the mercury was made of mild steel. The bottom was fitted internally with transverse mild steel fins. The top was formed by a standard industrial "Quickfit" glass (registered trademark) five-port fitting. Two independent variable speed stirrers each with two blades 2″ in diameter were immersed one in the amalgam and one in the aqueous phase. The amalgam stirrer had ¼″ wide blades, each set at an angle of 60° to the horizontal and 60° to each other. The aqueous stirrer blades were ⁵⁄₁₆″ wide and vertically disposed. Two vertical ½″ wide diametrically positioned baffles were provided at the vessel wall through the full depth of both phases. The main sections of the reactor were bolted together by rods. Fresh amalgam was admitted into the reactor through the wall of the mild steel base and spent amalgam was withdrawn at the bottom through a luted port situated diametrically opposite to the entrance. A glass down pipe in the vessel admitted the aqueous phase to the reactor and a side arm exit at the reactor top provided for removal of the products.

Sodium analgam containing 0.3% w./w. of sodium was fed at the rate of 85 ml./min. and an amalgam pool of 1″ depth was maintained. At this high throughput of amalgam per unit volume of amalgam bed high sodium conversion could be achieved under turbulent conditions only. Temperature was controlled at 40° C. by means of the cooling jacket. The aqueous phase was kept at a constant concentration of 4% w./v. acrylonitrile and 6% w./v. of trimethylcetylammonium bromide. A trace of p-nitrosodimethylaniline was added to the acrylonitrile as a stabilizer. Carbon dioxide was continuously fed to the reactor in excess of the quantity required to convert all sodium to sodium bicarbonate. This kept the solution at a pH not exceeding 8.5. In all experiments the desired degree of agitation in either phase characterized by the Reynolds number was attained by separate adjustment of the two stirrer speeds. The degree of turbulence for each phase is indicated in Table I. Results at 6% w./v. quaternary ammonium bromide for Examples 1 to 12 inclusive are given in Table I. Three more series of 3 experiments each, Examples 13 to 21, were conducted at concentrations of 1.4, 14.2 and 20% w./v. of the same quaternary ammonium compound and at the same stirring rates as Examples 1, 4 and 10 respectively.

In all Experiments 1 to 21 the ratio of adiponitrile to propionitrile was greater than (93±5) to (7±4), where ±5 and ±4 respectively are the range of variation between experiments and the analytical errors, and the mass ratio of total oligomers (timer and tetramer) to adiponitrile was less than 1 to 7. Conversion rates in Examples 13 to 21 inclusive were within ±5% of the corresponding figures given in Examples 1, 4 and 10 respectively.

TABLE I.—THE EFFECT OF TURBULENCE IN EACH PHASE

| Ex. No. | Aqueous phase, Reynolds number | Aqueous phase, energy dissipation wave number cm.$^{-1}$ | Amalgam phase, Reynolds number | Amalgam phase, energy dissipation wave number cm.$^{-1}$ | Percent sodium Conversion |
|---|---|---|---|---|---|
| 1 | 4,730 | 43 | 92,500 | 560 | 93.0 |
| 2 | 2,150 | 24 | 92,500 | 560 | 90.8 |
| 3 | 1,075 | 14 | 92,500 | 560 | 91.5 |
| 4 | 5,160 | 46 | 60,000 | 405 | 86.0 |
| 5 | 2,150 | 24 | 60,000 | 405 | 93.0 |
| 6 | 1,075 | 14 | 60,000 | 405 | 72.5 |
| 7 | 5,160 | 46 | 25,900 | 216 | 77.0 |
| 8 | 2,150 | 24 | 25,900 | 216 | 43.4 |
| 9 | 1,075 | 14 | 25,900 | 216 | 36.0 |
| 10 | 4,730 | 43 | 5,550 | 68 | 52.3 |
| 11 | 2,150 | 24 | 5,550 | 68 | 53.0 |
| 12 | 1,075 | 14 | 5,550 | 68 | 40.5 |

EXAMPLES 22 AND 23

These examples show the benefit of turbulent agitation on the yield of adiponitrile and sodium conversion when low quaternary ammonium salt concentrations are used.

EXAMPLE 22

Employing the apparatus of Example 1 a total volume of 4 litres of reactant solution was recycled at the rate of 0.3 litre/min. through the reactor. 85 ml./min. of sodium amalgam at a concentration of 0.3% w./w. sodium was fed continuously and the temperature was controlled at 40° C. by means of the water jacket. The concentration of acrylontirile was maintained in the aqueous phase at 2.0% w./v. by controlled feed of acrylonitrile. The monomer was stabilized by a trace of p-nitrosodimethylaniline. Carbon dioxide was continuously fed to the reactor in excess of the amount required to convert all sodium to sodium bicarbonate. This kept the pH of the solution at about 8.5. The aqueous phase was stirred to obtain Reynolds number of about 5,200 at the stirrer blade tip whilst the Reynolds number in the amalgam phase was 185,000. The average concentration of trimethylcetylammonium bromide in the aqueous phase at 2.3% w./v. was maintained at this level by continuous addition. About one pound of organic product was obtained and combined liquid- and gas-chromatographic and conventional analysis showed that it contained:

Percent w./w.
Adiponitrile _____ 85.0
Propionitrile _____ 7.1
Oligomers of Acrylonitrile _____ 7.9

Sodium conversion was 98.7%. On adsorption of the reactor vent gases in a caustic soda absorber no gas emerged from the last bubbler, i.e. no hydrogen was formed.

EXAMPLE 23

The conditions of Example 22 were repeated except that in this experiment there was no stirring of the amalgam phase.

Combined gas- and liquid-chromatographic and conventional analysis of the product formed gave a product distribution of:

| | Percent w./w. |
|---|---|
| Adiponitrile | 57.0 |
| Propionitrile | 38.6 |
| Oligomers | 4.4 |
| Sodium conversion | 32.2 |

EXAMPLES 24–31

These examples show the effect of reducing quaternary ammonium salt concentration when employing a "dense fluidised bed."

The apparatus described in the body of the specification and illustrated by FIGS. 1, 2, 3, 4 and 5 was operated under the following conditions:

Aqueous phase flow rate through the reactor 4 (FIG. 1) was adjusted to give a cylindrical dense amalgam bed 1" deep and 1" in diameter. The heat of reaction was removed by means of heat exchanger H (FIG. 4) in the recirculation circuit U (FIG. 4) and the reaction temperature was controlled to 40° C., measured in the disengagement space (item 8 in FIG. 1). Amalgam flow rate was adjusted to 85 ml./min. of sodium amalgam at 0.3% w./w. sodium. The acrylonitrile which was stabilised by a trace of p-nitrosodimethylaniline was maintained at a constant concentration for each run by continuous controlled addition. Carbon dioxide was continuously admitted to the reactor in excess of the quantity required for conversion of all sodium to sodium bicarbonate. No hydrogen was detected by the method described in Example 22. A sequence of runs at progressively reduced concentrations of trimethylcetylammonium bromide concentration was carried out and for each run the product distribution was determined by combined liquid- and gas-chromatography and conventional analysis. Experimental conditions and results are given in Table II. Sodium conversion was very close to 100% in each experiment (better than 99.9%). Continuous operation was maintained for periods ranging from 2 to 8 hours.

TABLE II.—THE EFFECT OF REDUCING QUARTERNARY AMMONIUM SALT CONCENTRATION IN DENSE FLUID BED REACTOR

| Example No. | Trimethyl cetyl-ammonium bromide conc., per-cent w./v. | Acrylonitrile conc., per-cent w./v. | Percent w./w. product distribution | | |
|---|---|---|---|---|---|
| | | | Adipo-nitrile | Propio-nitrile | Oligomers |
| 24 | 21.00 | 3.4 | 82.3 | 6.7 | 11.0 |
| 25 | 8.50 | 3.2 | 85.1 | 5.7 | 9.2 |
| 26 | 2.00 | 2.2 | 82.8 | 4.0 | 13.2 |
| 27 | 0.60 | 1.7 | 85.5 | 10.4 | 4.1 |
| 28 | 0.25 | 2.7 | 77.9 | 9.5 | 12.6 |
| 29 | 0.10 | 1.3 | 71.4 | 18.5 | 10.1 |
| 30 | 0.01 | 1.7 | 25.3 | 73.5 | 1.7 |
| 31 | 0.00 | 2.6 | 18.4 | 75.0 | 6.6 |

EXAMPLE 32

Employing the "fluidised bed" reactor as shown in FIG. 1 and described in Example 24, and the apparatus as shown in FIG. 4, a total volume of 14 litres of reactant solution was recycled at the rate of 1 gal./min. through the reactor. 85 mls./min. of sodium amalgam at a concentration of 0.3% w./w. sodium were fed continuously and the temperature controlled at 40° C. by means of the heat exchanger. The monomer was stabilised by a trace of p-nitrosodimethylaniline. Carbon dioxide was continuously fed to the reactor in excess of the amount required to convert all sodium to sodium bicarbonate. This kept the pH of the solution at about 8.5. The distributor plate 3 in FIG. 1 had a 13% free area and the depth of the "dense fluid bed" maintained at 2". With this arrangement volume fraction of the bed was 40–50% amalgam. Concentrations of acrylonitrile and trimethyl cetylammonium bromide were maintained at 3.5 and 12.0% w./w. respectively in the aqueous phase by continuous addition. After 11 hours running about 11 lbs. of product were obtained; combined liquid- and gas-chromatographic analyses showed that it contained

| | Percent w./w. |
|---|---|
| Adiponitrile | 84.5 |
| Propionitrile | 6.8 |
| Oligomers of acrylonitrile | 8.7 |

Sodium conversion in this highly turbulent system was 98.7%.

EXAMPLES 33 TO 35

The conditions of Example 32 were repeated except that the concentrations of acrylonitrile and cetyltrimethylammonium bromide were maintained at different levels. The product distributions were obtained by combined gas- and liquid-chromatographic analyses. The results are shown in Table III.

TABLE III

| Example No. | Trimethyl cetyl-ammonium bromide conc., per-cent w./v. | Acrylonitrile conc., per-cent w./v. | Percent w./w. product distribution | | |
|---|---|---|---|---|---|
| | | | Adipo-nitrile | Propio-nitrile | Oligomers |
| 33 | 2 | 3 | 82.1 | 5.2 | 12.1 |
| 34 | 15 | 5 | 82.1 | 7.7 | 10.2 |
| 35 | 2 | 1 | 80.0 | 7.9 | 12.1 |

EXAMPLE 36

This example demonstrates the process in a predominantly organic medium comprising more than 50% w./w. of an aprotic polar solvent, namely adiponitrile, i.e. the reaction product itself.

Employing a reactor according to FIG. 1 having a "fluidised bed" diameter of ½" and a capacity of 34 mls., and the auxiliary equipment according to FIG. 4, 4 litres of an organic phase were recycled at a rate of 900 mls./min. through the reactor. Amalgam (0.3% w./w. Na) was supplied at a rate of 30–40 mls./minute. The composition of the recycled organic phase was adiponitrile 85% w./w., acrylonitrile 7% w./w., tetra-ethylammonium chloride 3% w./w. and water 5% w./w. The fluidised bed contained about 50% by volume of amalgam. Carbon dioxide was continuously fed to the reactor in excess of the amount required to convert all sodium to sodium bicarbonate. Acrylonitrile, tetraethylammonium chloride and water were added in sufficient quantities to maintain their initial concentrations.

After running for 280 minutes, the product distribution obtained by gas- and liquid-chromatography was

| | Percent w./w. |
|---|---|
| Adiponitrile | 88.0 |
| Propionitrile | 5.2 |
| Trimer | 6.8 |

EXAMPLE 37

This example demonstrates the process in the presence of more than 50% w./w. of mixed aprotic polar solvents in the medium. Experiment 36 was repeated as described using, however, an organic recycle phase of the following composition: adiponitrile 50% w./w., acrylonitrile 7% w./w., acetonitrile 32% w./w., xylene 3% w./w., tetraethyl ammonium chloride 3% w./w. and water 5% w./w. 2 lbs. of organic product were obtained and analysed by gas- and liquid-chromatography as follows:

| | Percent w./w. |
|---|---|
| Adiponitrile | 92.0 |
| Propionitrile | 6.4 |
| Trimer | 1.6 |

Amalgam flow rates of 40 mls./min. with an inlet sodium concentration of 0.3% w./w. resulted in sodium conversions of 99.9%. The hold-up of amalgam in the bed was between 35 and 45% amalgam by volume.

EXAMPLE 38

This example demonstrates the process in the presence of more than 50% w./w. of an aprotic polar solvent in the medium. Example 36 was repeated using, however, an organic phase of the following recycle composition: acetonitrile 75% w./w., acrylonitrile 6% w./w., tetraethylammonium chloride 3% w./w., water 6% w./w. and adiponitrile 10% w./w. The product distribution was:

|  | Percent w./w. |
|---|---|
| Adiponitrile | 93.6 |
| Propionitrile | 1.7 |
| Trimer | 4.7 |

EXAMPLES 39 TO 48 INCLUSIVE

Examples 39 to 48 show the effect of turbulence in each phase on sodium conversion.

These experiments were carried out as described for Example 1 in a stirred reactor using, however, a predominantly organic phase of the initial composition: adiponitrile 80% w./w., acrylonitrile 10% w./w., tetraethylammonium chloride 5% w./w., water 5% w./w. and an amalgam flow rate of 19 ml./min. (0.3% w./w. Na). Results are given in Table IV. As is evident from the results, high sodium conversions were achieved only at high levels of turbulence.

TABLE IV.—THE EFFECT OF TURBULENCE IN EACH PHASE

| Ex. No. | Organic phase, Reynolds number | Organic phase, energy dissipation wave number cm.$^{-1}$ | Amalgam phase, Reynolds number | Amalgam phase, energy dissipation, wave number cm.$^{-1}$ | Percent sodium conversion |
|---|---|---|---|---|---|
| 39 | 15,000 | 101 | 1.95×10$^5$ | 987 | 99 |
| 40 | 2,590 | 27 | 1.95×10$^5$ | 987 | 99 |
| 41 | 1,040 | 16 | 1.95×10$^5$ | 987 | 79 |
| 42 | 15,000 | 101 | 7.81×10$^4$ | 495 | 65 |
| 43 | 8,540 | 66 | 8.21×10$^4$ | 514 | 71 |
| 44 | 8,280 | 65 | 1.95×10$^4$ | 175 | 85 |
| 45 | 10,040 | 75 | 0.98×10$^4$ | 105 | 69 |
| 46 | 8,280 | 65 | 3,900 | 52 | 25 |
| 47 | 2,590 | 27 | 3,900 | 52 | 12 |
| 48 | 828 | 12 | 4,690 | 60 | 18 |

EXAMPLES 49 TO 73

The reactor used for characterising the fluid dynamics, and sodium efficiency in a "dense fluidised bed" reactor consisted of a 4.83 cm. diameter glass section in which the top of the amalgam bed was fixed by an overflow weir and a larger diameter section (10.16 cm. diameter) acting as a disengagement space for separation of the spent amalgam and the fluidising monomer-containing phase.

Amalgam was fed into the reactor through a central 3/16″ I.D. tube, which also supported the distributor plate. The amalgam stream entered the reactor 3 mm. above the centre of the distributor plate. The distributor plates investigated had ratios of the total hole area for flow of the fluidising phase to the total area of the plate of 4.2, 5, 10 and 15%, while the hole diameters were 1.0, 1.5, 3.0 and 4.0 mm.

The flow rates of the fluidising medium containing the reacting acrylonitrile were varied over the entire fluidisation range, i.e. from a low degree of turbulence at which an amalgam phase was agitated by gently passing fluidising phase bubbles through it, to a high degree of turbulence at which the amalgam phase was fully dispersed and substantially carried out of the reactor with the flow of the fluidising phase. The fluidising phase was circulated externally to the reactor. A heat exchanger, pump, flow rotameter and a flow control valve were in the external fluid circuit.

The outlet amalgam was returned to an acid denuder from which the spent amalgam was circulated through an amalgam cell, a flow control valve and a flow recovery device, before being returned as new amalgam to the base of the reactor.

For experiments 49 to 73 the amalgam feed rate was 405 mls./min. and the fluidising organic phase had the following composition: tetraethylammonium chloride 5% w.w., adiponitrile 59% w./w., acetonitrile 20% w./w., water 6% w./w., acrylonitrile 7% w./w. and xylene 3% w./w.; the sodium conversions and the ease of operation at various degrees of turbulence and fluidisation were determined. Results are given in Table V.

TABLE V.—EFFICIENCY OF THE "FLUDIZED BED" AS A REACTOR

| Ex. No. | Flow of fluidizing phase ft./sec. | Depth of fluidised bed | Distributor plate Free area, percent | Distributor plate Hole size, mm. | Vol. fraction amalgan in the bed | Reynolds number of organic phase | Organic phase energy dissipation wave number cm.$^{-1}$ | Amalgam phase energy dissipation wave number cm.$^{-1}$ | Percent sodium conversion | Inlet amalgam conc. percent Na w./w. | Limitations on the operation of the bed. |
|---|---|---|---|---|---|---|---|---|---|---|---|
| 49 | 0.0945 | 3″ | 5 | 3 | 0.964 | 780 | 111 | 592 | 57.2 | 0.014 | Tendency for amalgam in all but the lowest percent free area plates to fall through orifices in this region. |
| 50 | 0.0945 | 3″ | 5 | 4 | 0.950 | 1,050 | 130 | 580 | | | Fall-through rate of amalgam fed to the reactor 11 percent (in Ex. 56). |
| 51 | 0.0945 | 3″ | 4.2 | 1.5 | 0.885 | 588 | 124 | 606 | 82.4 | 0.013 | |
| 52 | 0.0945 | 3″ | 4.2 | 1.5 | 0.878 | 588 | 124 | 608 | 90.0 | 0.070 | |
| 53 | 0.165 | 3″ | 10 | 3 | 0.770 | 685 | 114 | 700 | | | Fall-through rate of amalgam 17%. |
| 54 | 0.163 | 3″ | 4.2 | 1.5 | 0.756 | 1,015 | 153 | 710 | 87.3 | 0.016 | |
| 55 | 0.203 | 3″ | 5 | 3 | 0.735 | 1,690 | 149 | 742 | 93.0 | 0.013 | |
| 56 | 0.203 | 3″ | 4.2 | 1.5 | 0.750 | 1,260 | 170 | 706 | 99.5 | 0.061 | |
| 57 | 0.383 | 3″ | 15 | 3 | 0.655 | 1,076 | 193 | 885 | | | Fall-through rate of amalgam 40%. |
| 58 | 0.238 | 3″ | 4.2 | 1.5 | 0.640 | 1,480 | 173 | 749 | 86.8 | 0.014 | |
| 59 | 0.310 | 3″ | 4.2 | 1.5 | 0.590 | 1,920 | 180 | 827 | 88.0 | 0.059 | |
| 60 | 0.310 | 3″ | 5 | 3 | 0.584 | 2,580 | 180 | 842 | 98.8 | 0.014 | |
| 61 | 0.311 | 3″ | 4.2 | 1.5 | 0.497 | 1,940 | 189 | 785 | 100 | 0.017 | |
| 62 | 0.310 | 3″ | 5 | 1.5 | 0.490 | 1,300 | 165 | 1,024 | | | |
| 63 | 0.383 | 3″ | 10 | 4 | 0.461 | 2,130 | 174 | 867 | 100 | 0.013 | |
| 64 | 0.383 | 3″ | 15 | 4 | 0.432 | 1,410 | 172 | 860 | 100 | 0.118 | |
| 65 | 0.420 | 3″ | 5 | 3 | 0.389 | 3,490 | 202 | 970 | 100 | 0.013 | A slight dispersion of amalgam into colloidal particles, which are entrained in the flow of the fluidizing phase, <3% of the amalgam through-put dispersed. |
| 66 | 0.420 | 3″ | 4.2 | 1.5 | 0.396 | 2,610 | 219 | 890 | 100 | 0.079 | |
| 67 | 0.383 | 3″ | 4.2 | 1.5 | 0.360 | 2,390 | 203 | 825 | 100 | 0.011 | |
| 68 | 0.532 | 3″ | 5 | 3 | 0.310 | 1,420 | 232 | 1,060 | 100 | 0.020 | |
| 69 | 0.383 | 3″ | 5 | 1 | 0.295 | 1,060 | 111 | 1,035 | | | |
| 70 | 0.457 | 3″ | 4.2 | 1.5 | 0.237 | 2,850 | 219 | 912 | 100 | 0.019 | |
| 71 | 0.648 | 3″ | 5 | 3 | 0.231 | 5,380 | 262 | 1,338 | 100 | 0.017 | |
| 72 | 0.860 | 3″ | 5 | 3 | 0.187 | 7,150 | 316 | 1,070 | 100 | 0.020 | Dispersion of the amalgam severe in this region, >3%. Reaction rates drop off in this region. |
| 73 | 0.608 | 3″ | 4.2 | 1.5 | 0.180 | 3,780 | 262 | 1,530 | 99 | 0.011 | |

What is claimed is:

1. Apparatus for continuously reacting a liquid amalgam selected from alkali metal and alkaline earth metal amalgams with a liquid aqueous organic phase comprising water and a monomer selected from $\alpha,\beta$-olefinically unsaturated nitriles and esters so as to effect conversion of the said monomer to its hydrodimer which comprises an enclosed essentially vertical reaction vessel, a distributor plate extending essentially horizontally across said vessel, a dense fluidized bed of amalgam above said distributor plate and supported thereby comprising in intimate mixture said amalgam and said liquid aqueous organic phase, in which fluidized bed the amalgam is not disintegrated into particulate droplets but remains as an essentially coherent and essentially physically interconnected fluid in which the voids formed by the liquid aqueous organic phase fluctuate rapidly and pass upwardly through the amalgam, the amalgam constituting between 65% to 20% by volume of said fluidized bed, a disengagement space above the fluidized bed in which the spent amalgam and liquid aqueous organic phase may separate from each other, said disengagement means being a widened portion of the vessel above the fluidized bed in which the flow velocity of the reactants is reduced, means for feeding amalgam into the fluidized bed above the distributor plate, means for feeding liquid aqueous organic phase into the vessel below said distributor plate, the said distributor plate being provided with orifices such that the liquid aqueous organic phase may pass upwardly therethrough into said fluidized bed but the amalgam of the fluidized bed is at least partly prevented from passing downwardly therethrough, and means for removing the spent amalgam and the liquid aqueous organic phase containing the said hydrodimer from the vessel in the disengagement space, said last mentioned means including overflow means for the spent amalgam at the transition point between the narrow and wide sections of said vessel and a liquid cyclone for separating any residual spent amalgam from the liquid aqueous organic phase.

2. An apparatus according to claim 1 wherein the overflow means is a weir.

3. An apparatus according to claim 1 wherein there is provided, below the said distributor plate but above the means for feeding liquid aqueous organic phase with the vessel, a second distributor plate extending essentially horizontally across the vessel for controlling the flow of the liquid aqueous organic phase.

4. Apparatus for continuously reacting a liquid amalgam selected from alkali metal and alkaline earth metal amalgams with a liquid aqueous organic phase comprising water and a monomer selected from $\alpha,\beta$-olefinically unsaturated nitriles and esters so as to effect conversion of the said monomer to its hydrodimer which comprises an enclosed essentially vertical reaction vessel, a distributor plate extending essentially horizontally across said vessel, a dense fluidized bed of amalgam above said distributor plate and supported thereby comprising in intimate mixture said amalgam and said liquid aqueous organic phase, in which fluidized bed the amalgam is not disintegrated into particular droplets but remains as an essentially coherent and essentially physically interconnected fluid in which the voids formed by the liquid aqueous organic phase fluctuate rapidly and pass upwardly through the amalgam, the amalgam constituting between 65% and 20% by volume of said fluidized bed, a disengagement space above the fluidized bed in which the spent amalgam and liquid aqueous organic phase may separate from each other, said disengagement means being a widened portion of the vessel above the fluidized bed in which the flow velocity of the reactants is reduced, means for feeding amalgam into the fluidized bed above the distributor plate, means for feeding liquid aqueous organic phase into the vessel below said distributor plate, the said distributor plate being provided with orifices such that the liquid aqueous organic phase may pass upwardly therethrough into said fluidized bed but the amalgam of the fluidized bed is at least partly prevented from passing downwardly therethrough, and means for removing the spent amalgam and the liquid aqueous organic phase containing the said hydrodimer from the vessel in the disengagement space, said last-mentioned means including overflow means for the spent amalgam at the transition point between the narrow and wide sections of said vessel, said distributor plate being moveable in a vertical direction so as to adjust the depth of the fluidized bed.

References Cited
UNITED STATES PATENTS

| | | | |
|---|---|---|---|
| 2,761,889 | 9/1956 | May et al. | 23—285X |
| 2,836,902 | 6/1958 | North | 23—288X |
| 3,193,574 | 7/1965 | Katchalsky et al. | 260—465.8 |
| 3,462,478 | 8/1969 | Fanshawe | 204—73X |

JOSEPH SCOVRONEK, Primary Examiner

D. G. MILLMAN, Assistant Examiner

U.S. Cl. X.R.

260—465.8, 690